United States Patent
Yamada et al.

(10) Patent No.: US 10,623,919 B2
(45) Date of Patent: Apr. 14, 2020

(54) IOT DEVICE, COMMUNICATION SYSTEM, AND CONTROL METHOD AND CONTROL PROGRAM FOR IOT DEVICE

(71) Applicant: NEC Corporation, Tokyo (JP)

(72) Inventors: Toru Yamada, Tokyo (JP); Akira Kamei, Tokyo (JP); Masahiro Serizawa, Tokyo (JP); Kyoji Hirata, Tokyo (JP); Yumiko Okuyama, Tokyo (JP); Satoshi Hasegawa, Tokyo (JP); Masashi Shimoma, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/335,590

(22) PCT Filed: Sep. 21, 2017

(86) PCT No.: PCT/JP2017/034177
§ 371 (c)(1),
(2) Date: Mar. 21, 2019

(87) PCT Pub. No.: WO2018/056386
PCT Pub. Date: Mar. 29, 2018

(65) Prior Publication Data
US 2020/0029184 A1   Jan. 23, 2020

(30) Foreign Application Priority Data

Sep. 23, 2016   (JP) .................................. 2016-186224

(51) Int. Cl.
*H04W 4/24*  (2018.01)
*H04W 4/70*  (2018.01)
(Continued)

(52) U.S. Cl.
CPC ........... *H04W 4/24* (2013.01); *H04L 12/1403* (2013.01); *H04W 4/70* (2018.02); *H04W 4/80* (2018.02); *H04W 88/04* (2013.01)

(58) Field of Classification Search
CPC .......... H04W 4/24; H04W 4/70; H04W 4/80; H04W 88/04; H04L 12/1403
See application file for complete search history.

(56) References Cited

U.S. PATENT DOCUMENTS

2011/0258327 A1 * 10/2011 Phan .................... H04W 76/14
                                                           709/227
2015/0006695 A1    1/2015 Gupta
(Continued)

FOREIGN PATENT DOCUMENTS

JP    H9-321711 A    12/1997
JP    H10-126531 A    5/1998
(Continued)

OTHER PUBLICATIONS

International Search Report corresponding to PCT/JP2017/034177 dated Dec. 12, 2017 (5 pages).
(Continued)

*Primary Examiner* — Wayne H Cai
(74) *Attorney, Agent, or Firm* — Wilmer Cutler Pickering Hale and Dorr LLP

(57) ABSTRACT

An IoT device for properly performing charging even when data from an IoT device is relayed and transmitted to a base station includes a first transmitter that directly transmits acquired data to the base station, a second transmitter that transmits the data to a neighboring device by near-field communication to relay the data by the neighboring device and transmit the data to the base station, and a third transmitter that transmits, to the base station, communication cost bearer information representing that the user of the IoT device bears the communication cost of the data relayed by the neighboring device and transmitted.

20 Claims, 4 Drawing Sheets

(51) Int. Cl.
*H04L 12/14* (2006.01)
*H04W 4/80* (2018.01)
*H04W 88/04* (2009.01)

(56) References Cited

U.S. PATENT DOCUMENTS

2016/0192418 A1* 6/2016 Yang ................... H04W 76/14
370/252
2017/0093462 A1 3/2017 Kumaki et al.
2019/0281582 A1* 9/2019 Chen ................... H04W 8/005

FOREIGN PATENT DOCUMENTS

| JP | 2002-027651 A | 1/2002 |
| JP | 2004-200782 A | 7/2004 |
| JP | 2015-177267 A | 10/2015 |
| JP | 2016-116194 A | 6/2016 |
| WO | WO-2014/210330 A1 | 12/2014 |

OTHER PUBLICATIONS

3GPP TR 23.703 V12.0.0 Technical Specification Group Services and Systems Aspects; Study on Architecture Enhancements to Support Proximity-based Services (ProSe) (Release 12) (Feb. 2014) (pp. 1-324).

* cited by examiner

IOT DEVICE, COMMUNICATION SYSTEM, AND CONTROL METHOD AND CONTROL PROGRAM FOR IOT DEVICE

CROSS-REFERENCE TO RELATED APPLICATIONS

This application is a national stage application of International Application No. PCT/JP2017/034177 entitled "IoT Device, Communication System, and Control Method and Control Program for IoT Device" filed on Sep. 21, 2017, which claims priority to Japanese Application No. 2016-186224 filed on Sep. 23, 2016, the disclosures of which are hereby incorporated by reference in their entirety.

TECHNICAL FIELD

The present invention relates to an IoT device, a communication system, and a control method and control program for the IoT device.

BACKGROUND ART

As one form of ProSe (Proximity Service), FIG. 6.3.11.1-3 in non-patent literature 1 discloses a form in which many IoT (Internet of Things) devices and a base station communicate with each other via relays.

Patent literature 1 discloses a technique of transmitting data sensed by an IoT device to an application via a neighboring controller device.

CITATION LIST

Patent Literature

Patent literature 1: WO2014/210330

Non-Patent Literature

Non-patent literature 1: 3GPP TR 23.703 V12.0.0 (2014-02)

SUMMARY OF THE INVENTION

Technical Problem

In the technique described in the above literature, however, when an IoT device is a charging target, relay sometimes disables charging.

The present invention enables to provide a technique of solving the above-described problem.

Solution to Problem

One example aspect of the present invention provides an IoT device comprising:

a first transmitter that directly transmits acquired data to a base station;

a second transmitter that transmits the data to a neighboring device by near-field communication to relay data by the neighboring device and transmit the data to the base station; and a third transmitter that transmits, to the base station, communication cost bearer information representing that a user of the IoT device bears a communication cost of the data relayed by the neighboring device and transmitted.

Another example aspect of the present invention provides a communication system including an IoT device, comprising:

a subtracter that subtracts, from a charge on the neighboring device, all or part of a difference between a communication cost imposed when the IoT device directly transmits the data to the base station and a communication cost imposed when the data is relayed by the neighboring device and transmitted.

Still other example aspect of the present invention provides a control method for an IoT device, comprising:

transmitting acquired data to a neighboring device by near-field communication; and transmitting, to a base station, communication cost bearer information representing that a user of the IoT device bears a communication cost of the data relayed by the neighboring device and transmitted.

Still other example aspect of the present invention provides a control program for an IoT device for causing a computer to execute a method, comprising:

transmitting acquired data to a neighboring device by near-field communication; and transmitting, to a base station, communication cost bearer information representing that a user of the IoT device bears a communication cost of the data relayed by the neighboring device and transmitted.

Advantageous Effects of Invention

According to the present invention, charging can be performed properly even when data from an IoT device is relayed and transmitted to a base station.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

Figure 1:
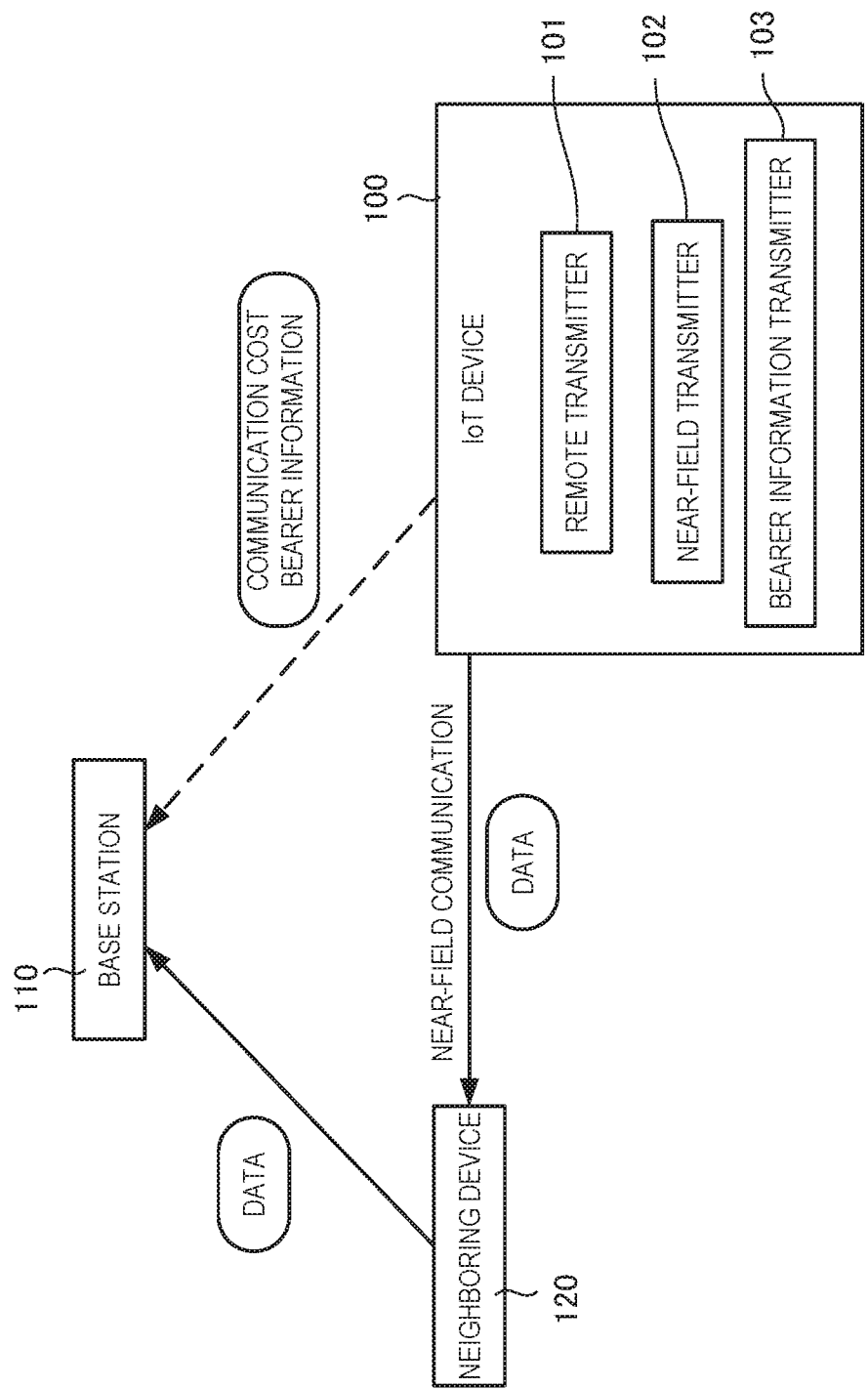
FIG. 1 is a block diagram showing the arrangement of a communication system according to the first example embodiment of the present invention.

An IoT device 100 according to the first example embodiment of the present invention will be described with reference to FIG. 1. As shown in FIG. 1, the IoT device 100 includes a remote transmitter 101, a near-field transmitter 102, and a bearer information transmitter 103. Here, the "IoT device" is a concept including all devices connectable to the Internet, varying from a simple sensor to an information processing terminal (mobile terminal).

The remote transmitter 101 directly transmits data acquired by the IoT device 100 to a base station 110.

To relay data by a neighboring device 120 and transmit it to the base station 110, the near-field transmitter 102 transmits the data to the neighboring device 120 by near-field communication. Here, the neighboring device may be an information processing terminal (mobile terminal).

The bearer information transmitter 103 transmits, to the base station 110 via the neighboring device 120, communication cost bearer information representing that the user of the IoT device 100 bears the communication cost of data relayed by the neighboring device 120 and transmitted to the base station 110.

With the above-described arrangement, even if the IoT device 100 cannot transmit data to the base station 110 for some reason, data can be delivered to the base station 110 by effectively using the neighboring device 120 without changing the bearer of the communication cost.

Second Example Embodiment

Figure 2:
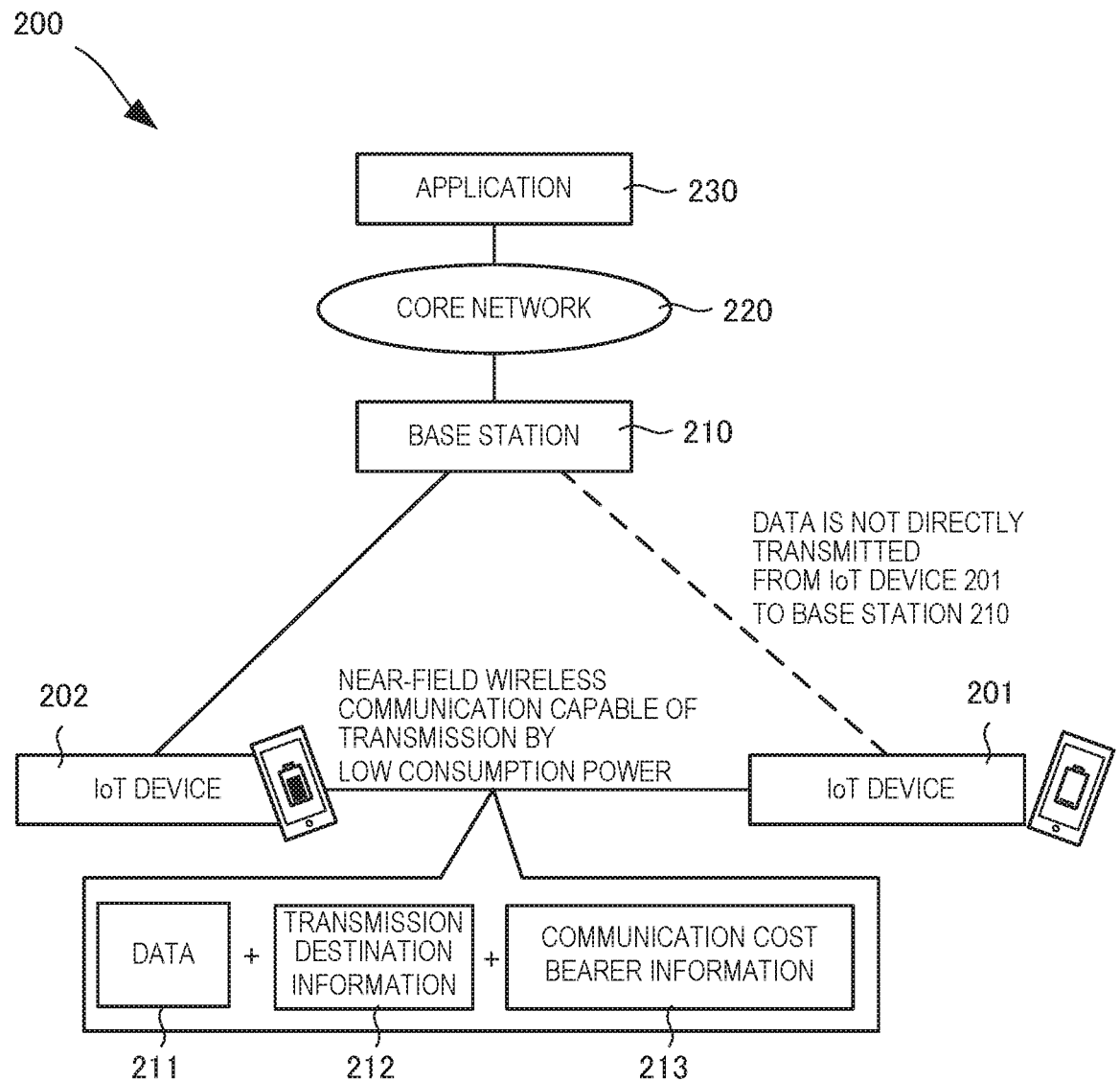
FIG. 2 is a block diagram showing the arrangement of a communication system according to the second example embodiment of the present invention.

Next, a communication system 200 according to the second example embodiment of the present invention will be described with reference to FIG. 2. FIG. 2 is a view for explaining the schematic arrangement of the communication system 200 including IoT devices according to this example embodiment.

The communication system 200 includes IoT devices 201 and 202, a base station 210, a core network 220, and an application 230. Although only two IoT devices are illustrated, the present invention is not limited to this and three or more IoT devices may be included.

The IoT device 201 transmits acquired data in response to a request from the application 230. At this time, the IoT device 201 is assumed to transmit data to the application 230 using a wireless network available depending on the subscription contract.

The distance between the IoT devices 201 and 202 is sufficiently short, and direct communication between devices without the mediacy of the base station 210 defined by 3GPP TS 23.303 or near-field wireless communication such as Bluetooth® is possible.

When transmitting data 211 from the IoT device 201 to the base station 210 via the IoT device 202, information (communication cost bearer information) 213 representing an IoT device the user of which bears the cost of the communication is added besides transmission destination information 212 representing the application 230 as the transmission destination of the data 211.

The communication contractor of the IoT device 201 can be charged for the communication cost of the data 211 transmitted from the IoT device 201.

At this time, the IoT device 201 may store the number of requests to the IoT device 202 for communication and the timings of the requests, and directly notify the base station 210 of the request situation at a predetermined timing (for example, once a month). This can prevent communication with the base station by the IoT device 202 that lies about a request from the IoT device 201, and implement correct charging.

In 3GPP that formulates international standards for wireless networks, a control method about charging is standardized as TS 23.203. In TS 23.203, a PCRF (Policy and Charging Rules Function) is prepared to enable flexible control of the policy and charging rules for each packet. In application to a 3GPP wireless network, PCRF acquires communication cost bearer information and controls charging.

Figure 3:
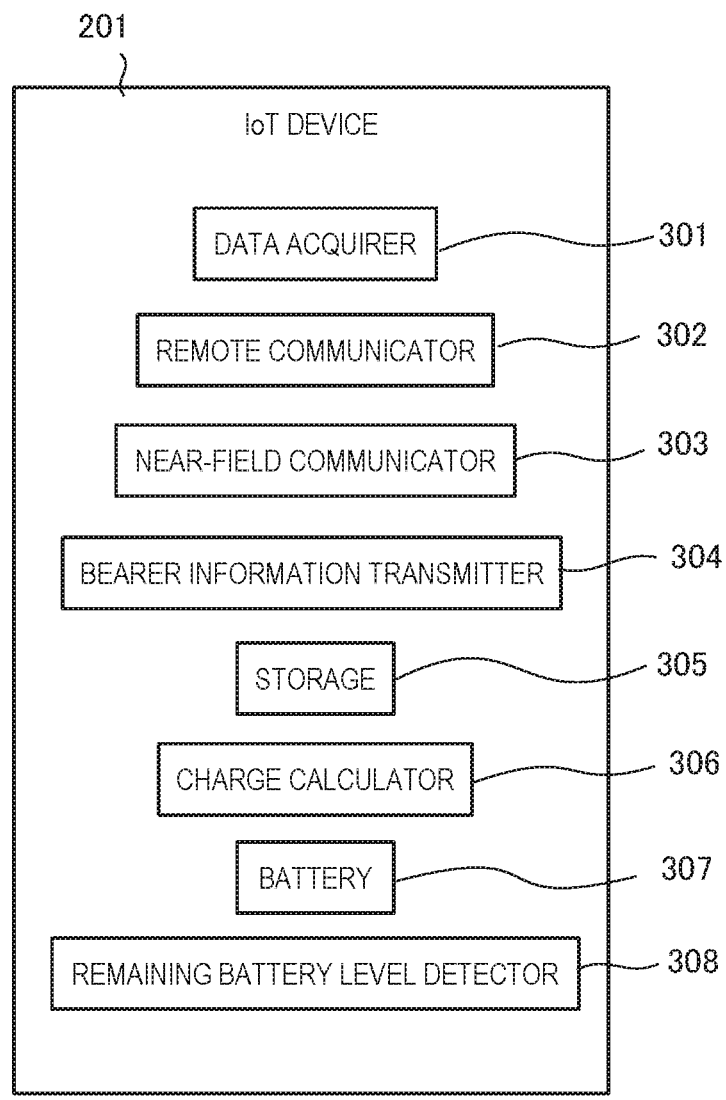
FIG. 3 is a block diagram showing the arrangement of an IoT device according to the second example embodiment of the present invention.

FIG. 3 is a block diagram showing the functional arrangement of the IoT device 201. The IoT device 201 includes a data acquirer 301, a remote communicator 302, a near-field communicator 303, a bearer information transmitter 304, a storage 305, a charge calculator 306, a battery 307, and a remaining battery level detector 308.

The data acquirer 301 is, for example, a temperature sensor and acquires data about a temperature sensed at a predetermined timing.

The remote communicator 302 is a communicator for transmitting data to the application 230 using a wireless network available depending on the subscription contract. The near-field communicator 303 is a communicator that implements communication between devices defined by 3GPP TS 23.303 or near-field wireless communication such as Bluetooth®. The bearer information transmitter 304 transmits information representing the bearer of the communication cost. The near-field communicator 303 can search for and discover a device present near by so-called discovery.

The storage 305 stores, as a transmission history, the amount of data relayed through a neighboring device by the near-field communicator 303 and transmitted to the base station 210, and the date and time. It is also possible to store whether the IoT device 201 requests the relay of communication of the IoT device 202, and directly notify the base station 210 of the request situation (or the total communication cost) by the IoT device 201 at a predetermined timing (for example, once a month).

The charge calculator 306 calculates an amount of money which the IoT device 201 is charged, at a predetermined timing based on the transmission history stored in the storage 305. The charge calculator 306 transmits the calculated amount of money as communication cost bearer information to the base station 210 using the remote communicator 302.

The battery 307 is a rechargeable battery for driving the IoT device 201. The remaining battery level detector 308 detects an amount of power remaining in the battery 307 and determines whether to avoid communication by the remote communicator 302. If the remaining battery level detector 308 determines to avoid remote communication, the function of the remote communicator 302 is stopped.

Figure 4:
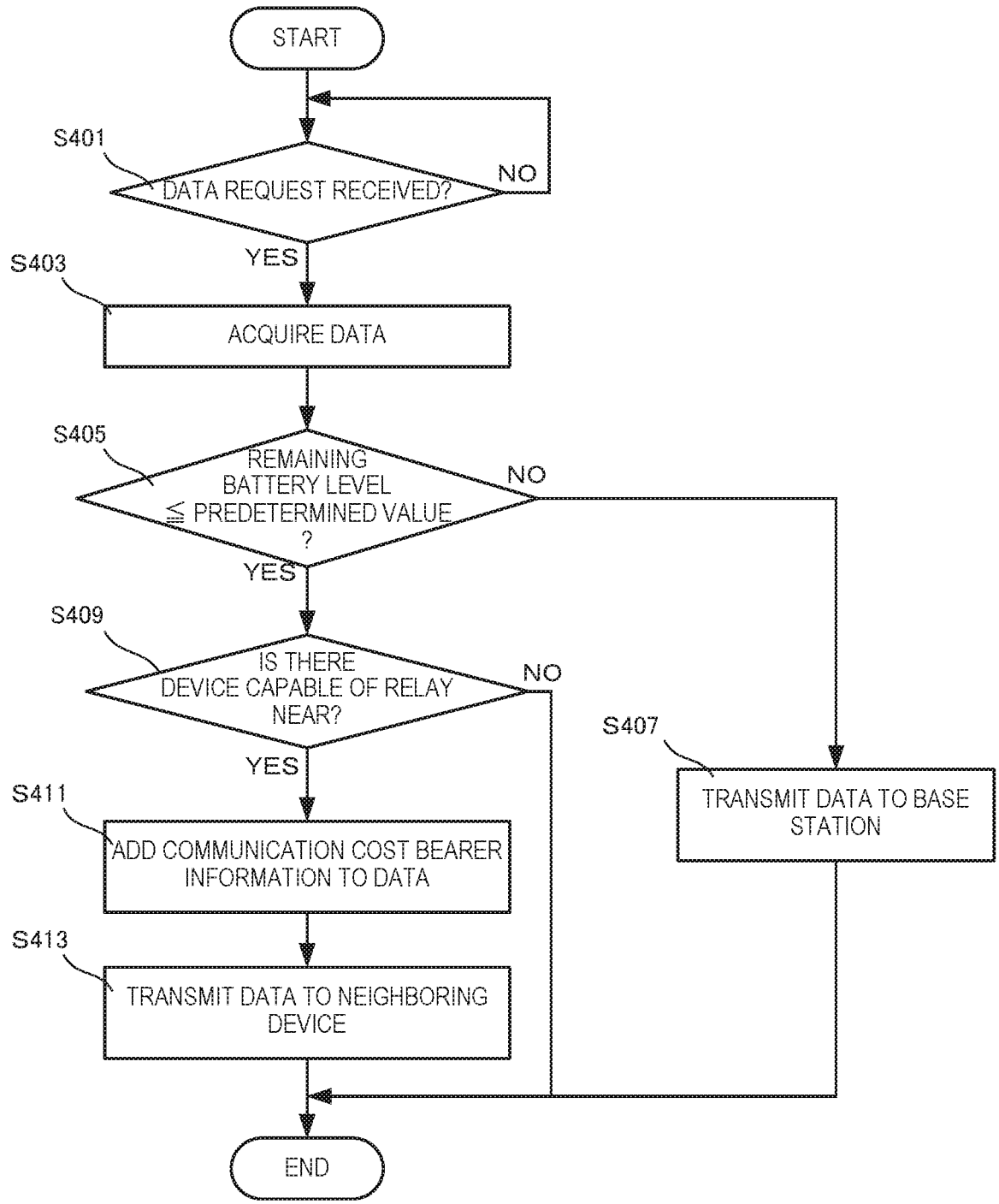
FIG. 4 is a flowchart showing a sequence of processing in the communication system according to the second example embodiment of the present invention.

FIG. 4 is a flowchart for explaining a sequence of processing in the IoT device 201. First, in step S401, it is determined whether a data request is received from the application 230. If the data request is received, the process advances to step S403 and the IoT device 201 acquires target data in accordance with the data request.

Then, in step S405, the remaining battery level detector 308 determines whether the remaining battery level of the IoT device 201 is equal to or lower than a predetermined value.

If the remaining level of the battery 307 in the IoT device 201 is satisfactorily high, the process advances to step S407 and the remote communicator 302 transmits the data 211 to the base station 210.

If the remaining level of the battery 307 in the IoT device 201 is equal to or lower than the predetermined value and is unsatisfactory, the process advances to step S409 and a device capable of relaying data is searched for near the IoT device 201 by a method such as discovery (S409). If a device capable of relaying data is not detected near the IoT device 201, the process ends. The near-field communicator 303 discovers the IoT device 202 installed near and transmits the data 211 to the base station 210 via the IoT device 202.

If a device capable of relay exists near the IoT device 201, the process advances to step S411, and the near-field communicator 303 adds the communication cost bearer information 213 to the data 211 to be transmitted and the transmission destination information 212 (S411) and simultaneously transmits them to the neighboring device (S413). The communication cost bearer information 213 is, for example, information representing that "the user of the IoT device 201 bears a communication cost necessary to transmit the data 211 from the IoT device 202 to the application 230 via the base station 210". That is, the charging target is the originator side. The communication cost bearer information may be transmitted to the core network separately from data to be originally transmitted. In 3GPP TS 32.015, a charging gateway is installed in a network to generate charging information. TS 32.015 describes that information is input to the charging gateway using a system separate from that for a data transmission packet.

After the IoT device 202 receives the data 211, the transmission destination information 212, and the communication cost bearer information 213 from the IoT device 201, it transmits them to the core network 220 via the base station 210. The data 211 from the IoT device 201 is further transmitted to the application 230 based on the transmission destination information 212. The communication cost bearer information 213 may be transmitted to the core network 220 separately from the data 211 from the IoT device 201. The communication cost bearer information 213 may be further transmitted to the application 230.

The above-described method can clarify an IoT device that bears a communication cost and can eliminate the financial burden of proxy communication by another device. It can therefore be expected to use an IoT device of low remaining battery level for a longer time than in the conventional technique.

Note that a communication cost imposed on the IoT device 201 when it transmits data of the IoT device 201 to the base station 210 via the IoT device 202 may be set to be higher than a communication cost imposed when the IoT device 201 directly transmits data to the base station 210. That is, the bearer information transmitter 304 transmits, as communication cost bearer information, information representing that the user of the IoT device 201 bears a communication cost higher than a communication cost imposed when the IoT device 201 directly transmits the data 211 to the base station 210.

The core network 220 may subtract, from the charge on the neighboring device 202, all or part of the difference between a communication cost imposed when the IoT device 201 directly transmits data to the base station 210 and a communication cost imposed when data is relayed by the neighboring device 202 and transmitted. That is, at least part of the difference of the communication cost which the IoT device 201 is charged may be returned to the communication contractor of the IoT device 202 that took charge of communication by proxy.

Note that the IoT device 201 may transmit data to the base station 210 not only via the IoT device 202 but also via two or more other IoT devices. For example, an up-link may be controlled to form IoT device 1→IoT device 2→IoT device 3→base station. In this case, information representing the route of transmission is also transmitted. The return of the difference of the communication cost can be shared between the communication contractor of IoT device 2 and the communication contractor of IoT device 3. This assumes that a terminal (IoT device 1) requesting relay bears a cost equivalent to the difference.

In this example embodiment, whether to perform relay transmission is determined in accordance with the remaining battery level. However, the present invention is not limited to this, and which of relay transmission and remote transmission to the base station is performed may be determined in accordance with the QOS of the IoT device 201.

The core network 220 may include a subtracter. The subtracter may subtract, from the charge on the neighboring device 202, all or part of the difference between a communication cost imposed when the IoT device 201 directly transmits the data 211 to the base station 210 and a communication cost imposed when data is relayed by the neighboring device 202 and transmitted.

OTHER EXAMPLE EMBODIMENTS

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of the example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. An IoT device comprising:
a first transmitter that directly transmits acquired data to a base station;
a second transmitter that transmits the data to a neighboring device by near-field communication to relay data by the neighboring device and transmit the data to the base station; and
a third transmitter that transmits, to the base station, communication cost bearer information representing that a user of the IoT device bears a communication cost of the data relayed by the neighboring device and transmitted.

2. The IoT device according to claim 1, wherein said second transmitter and said third transmitter simultaneously transmit the data and the communication cost bearer information to the base station by relaying the data and the communication cost bearer information by the neighboring device.

3. The IoT device according to claim 2, wherein said third transmitter transmits, as the communication cost bearer information, information representing that the user of the IoT device bears a communication cost higher than a communication cost imposed when the IoT device directly transmits the data to the base station.

4. The IoT device according to claim 3 further comprising:
a storage that stores a history of relaying data by the neighboring device and transmitting the data to the base station,
wherein said third transmitter transmits the communication cost bearer information totaled based on the history to the base station at a predetermined timing.

5. A communication system including the IoT device defined in claim 4, comprising:
a subtracter that subtracts, from a charge on the neighboring device, all or part of a difference between a communication cost imposed when the IoT device directly transmits the data to the base station and a communication cost imposed when the data is relayed by the neighboring device and transmitted.

6. A communication system including the IoT device defined in claim 3, comprising:
a subtracter that subtracts, from a charge on the neighboring device, all or part of a difference between a communication cost imposed when the IoT device directly transmits the data to the base station and a communication cost imposed when the data is relayed by the neighboring device and transmitted.

7. The IoT device according to claim 2 further comprising:
a storage that stores a history of relaying data by the neighboring device and transmitting the data to the base station,
wherein said third transmitter transmits the communication cost bearer information totaled based on the history to the base station at a predetermined timing.

8. A communication system including the IoT device defined in claim 7, comprising:
a subtracter that subtracts, from a charge on the neighboring device, all or part of a difference between a communication cost imposed when the IoT device directly transmits the data to the base station and a communication cost imposed when the data is relayed by the neighboring device and transmitted.

9. A communication system including the IoT device defined in claim 2, comprising:
a subtracter that subtracts, from a charge on the neighboring device, all or part of a difference between a communication cost imposed when the IoT device directly transmits the data to the base station and a communication cost imposed when the data is relayed by the neighboring device and transmitted.

10. The IoT device according to claim 1, wherein said third transmitter transmits, as the communication cost bearer information, information representing that the user of the IoT device bears a communication cost higher than a communication cost imposed when the IoT device directly transmits the data to the base station.

11. The IoT device according to claim 10 further comprising:
a storage that stores a history of relaying data by the neighboring device and transmitting the data to the base station,
wherein said third transmitter transmits the communication cost bearer information totaled based on the history to the base station at a predetermined timing.

12. A communication system including the IoT device defined in claim 11, comprising:
a subtracter that subtracts, from a charge on the neighboring device, all or part of a difference between a communication cost imposed when the IoT device directly transmits the data to the base station and a communication cost imposed when the data is relayed by the neighboring device and transmitted.

13. A communication system including the IoT device defined in claim 10, comprising:
a subtracter that subtracts, from a charge on the neighboring device, all or part of a difference between a communication cost imposed when the IoT device directly transmits the data to the base station and a communication cost imposed when the data is relayed by the neighboring device and transmitted.

14. The IoT device according to claim 1, further comprising:
a storage that stores a history of relaying data by the neighboring device and transmitting the data to the base station,
wherein said third transmitter transmits the communication cost bearer information totaled based on the history to the base station at a predetermined timing.

15. A communication system including the IoT device defined in claim 14, comprising:
a subtracter that subtracts, from a charge on the neighboring device, all or part of a difference between a communication cost imposed when the IoT device directly transmits the data to the base station and a communication cost imposed when the data is relayed by the neighboring device and transmitted.

16. A communication system including the IoT device defined in claim 1, to comprising:
a subtracter that subtracts, from a charge on the neighboring device, all or part of a difference between a communication cost imposed when the IoT device directly transmits the data to the base station and a communication cost imposed when the data is relayed by the neighboring device and transmitted.

17. A control method for an IoT device, comprising:
transmitting acquired data to a neighboring device by near-field communication; and
transmitting, to a base station, communication cost bearer information representing that a user of the IoT device bears a communication cost of the data relayed by the neighboring device and transmitted.

18. The control method for an IoT device according to claim 17, wherein the data and the communication cost bearer information are simultaneously transmitted to the base station by relaying the data and the communication cost bearer information by the neighboring device.

19. The control method for an IoT device according to claim 17, wherein the communication cost bearer information is information representing that the user of the IoT device bears a communication cost higher than a communication cost imposed when the IoT device directly transmits the data to the base station.

20. The control method for an IoT device according to claim 17 further comprising:
storing a history of relaying data by the neighboring device and transmitting the data to the base station, and
transmitting, to the base station, the communication cost bearer information totaled based on the history at a predetermined timing.

* * * * *